United States Patent
Orjans et al.

[11] 3,804,594
[45] Apr. 16, 1974

[54] APPARATUS FOR LIQUID-LIQUID EXTRACTION

[75] Inventors: Jerker Orjans; Martti Lamberg, both of Oulu, Finland

[73] Assignee: Kemira Oy, Helsinki, Finland

[22] Filed: Sept. 8, 1971

[21] Appl. No.: 178,729

[30] Foreign Application Priority Data
Sept. 9, 1970 Finland.............................. 2480/70

[52] U.S. Cl.................................. 23/270.5, 23/310
[51] Int. Cl........................................... B01d 11/04
[58] Field of Search.................. 23/267, 270.5, 310; 196/14.52

[56] References Cited
UNITED STATES PATENTS

| | | | |
|---|---|---|---|
| 3,362,791 | 1/1968 | Ryon | 23/267 R |
| 2,682,453 | 6/1954 | Holder | 23/270.5 |
| 2,937,078 | 5/1960 | Dukes | 23/270.5 |
| 3,544,079 | 12/1970 | Dressler | 23/267 R |
| 3,260,572 | 7/1966 | Faugeras | 23/270.5 |
| 3,206,288 | 9/1965 | Hazen | 23/270.5 |
| 2,980,514 | 4/1961 | Renner | 23/270.5 |
| 2,192,094 | 2/1940 | Moore | 23/270.5 |
| 2,594,675 | 4/1952 | Norell | 23/270.5 |
| 2,754,179 | 7/1956 | Whatley | 23/270.5 |
| 3,023,089 | 2/1962 | Graves | 23/270.5 |
| 2,084,342 | 6/1937 | Houghton | 23/270.5 |
| 2,076,126 | 4/1937 | Guipot | 23/270.5 |
| 2,176,899 | 10/1939 | Gordon | 23/270.5 |
| 3,479,378 | 11/1969 | Orlandini | 23/270.5 |

*Primary Examiner*—Norman Yudkoff
*Assistant Examiner*—S. J. Emery

[57] ABSTRACT

In an extraction apparatus for counter-current liquid-liquid extraction having several horizontally displaced extraction stages, each stage includes a mixing chamber with a mechanical mixer and further a settling basin with an auxiliary space connected to the mixing chamber through an opening or a pipe. From the upper part of each settling basin there runs a flow pipe to the upper part of the mixing chamber of the subsequent extraction stage, the lower part of the settling basin being connected to the lower part of the mixing chamber of the previous stage through said auxiliary space by connection means forming in the auxiliary space a vertically adjustable device, specifically a gooseneck pipe. Said auxiliary space may be situated within the settling basin and to the mixer of the mixing chamber there may be connected additional means promoting the flow of the heavier liquid.

2 Claims, 2 Drawing Figures

APPARATUS FOR LIQUID-LIQUID EXTRACTION

BACKGROUND OF THE INVENTION

1. Field of the Invention

This invention refers to an extraction apparatus for countercurrent liquid-liquid extraction of the type having several horizontally displaced extraction stages each one including a mixing chamber provided with a mechanical mixer and a settling basin with an auxiliary space connected to the mixing chamber.

2. Description of the Prior Art

The mixer-settler type extraction apparatuses usually consist of separate stages, which include a mixing chamber provided with a mechanical mixer where transfer of material takes place between the liquids which are insoluble or almost insoluble in each other, and a settling basin which is connected with the mixing chamber through an opening or a pipe and in which the said liquids, which have different densities, separate from each other under the influence of gravity and form two layers or phases. The said stages have been connected with each other so that the lighter liquid forming the upper layer in the settling space can flow into the mixing space of the subsequent stage and the heavier liquid forming the lower layer can respectively flow into the mixing space of the previous stage, or in such a manner that one of the liquids is removed from the apparatus if the stage is the last or the first in a mixer-settler type extraction apparatus. This arrangement creates the counter-current characteristic of liquid-liquid extraction. In the known Windscale extraction apparatuses (J. A. Williams, L. Lowes and M. S. Tanner: The Design of a simple Mixer Settler, Trans. Instn. Chem. Engrs. Vol. 36, 1953) all the stages are on the same level and the liquid phases run from one stage to another under the influence of the liquid flow caused by the elevation of the center of gravity in the mixing space due to the mixing of the phases. In a Windscale apparatus, however, the liquid flow is dependent on the depth of the apparatus, and consequently, when the production increases the volume of the apparatus must be considerably increased. To eliminate this disadvantage, several extraction apparatuses have been provided with outside or inside pumps with which one or both of the liquids is moved from one stage to another. This arrangement does increase the effectiveness of the extraction apparatus, but decreases its flexibility because, when the flows vary, the pumping must be regulated to prevent any changes in the position of the interface between the heavy and the light liquid in the settling space.

In the newest known extraction apparatuses the position of the interface between the liquids is regulated separately in each settling basin by a so-called gooseneck, that is, an L-shaped pipe or device in which one branch is longer than the other. This means more flexibility and hydrostatic independence between the stages. These apparatuses have been provided with two types of liquid transfer systems: the heavy liquid is lifted to the mixing space of the next stage (its upper part) by an apparatus, or the dispersion in the mixing space is lifted by the mixer or blades attached to its arm to the subsequent settling basin. (Vielstufen-Gegenstrom-Extraktoren (Lurgi.); Mixer-Settler Simplifies Design and Seale-up. Repr. from Sept. 1967 issue of Process Engineering, Plant & Control). In this apparatus type the consumption of energy is very high and the total solution is most disadvantageous with respect to mixing.

SUMMARY OF THE INVENTION

According to this invention there is provided an extraction apparatus comprising a flow pipe running from the upper part of each settling basin to the upper part of the mixing chamber of the subsequent extraction stage, and means for connecting the lower part of each settling space to the lower part of the mixing chamber of the previous extraction stage through the auxiliary space, said connecting means forming in the auxiliary space a vertically adjustable device, specifically a gooseneck pipe. Thus, in the new extraction apparatus, the heavy liquid coming from the auxiliary space is conducted to the lower part of the mixing zone of the previous stage and not to the upper part as in the apparatuses known so far. Since the density of the heavy liquid in the auxiliary space is greater than the density of the dispersion of the heavy and light liquids in the mixing space, the heavy liquid will flow into the mixing space without pumping even though the liquid level in the auxiliary space is lower than the dispersion level in the mixing space. An extraction apparatus according to the invention has the advantage that no separate pumps are required between the various stages and that the different stages are hydrostatically independent of each other.

To increase the effectiveness of an extraction apparatus according to the invention, separate additional devices can be attached to the mixers of the mixing spaces to promote the flow of the heavy liquid from one stage to another. The stages can also be graduated in the vertical direction, which will facilitate the flow of the lighter liquid.

DESCRIPTION OF THE PREFERRED EMBODIMENT

Figure 1:
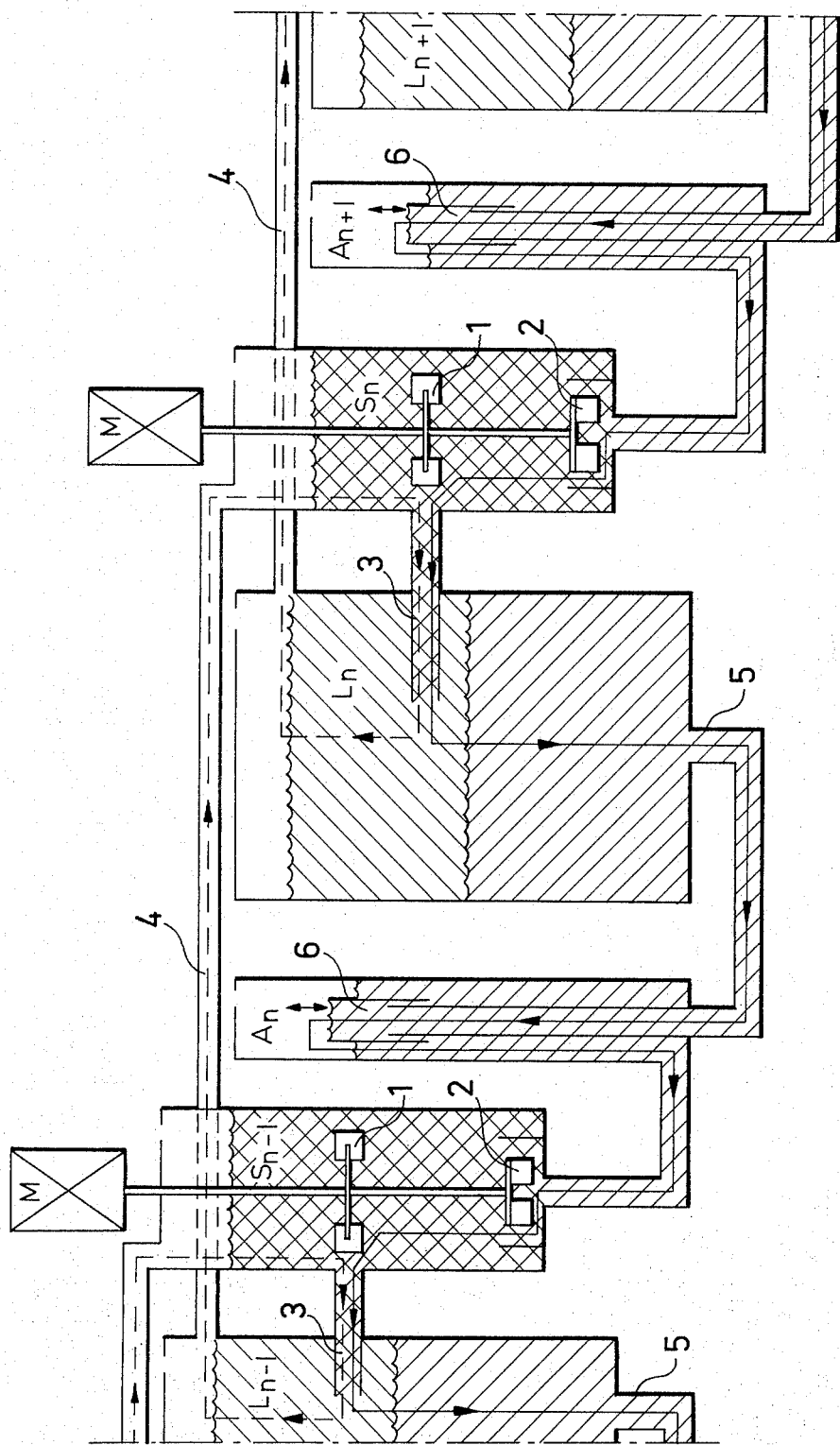
FIG. 1 shows schematically part of an extraction apparatus according to the invention.
Figure 2:
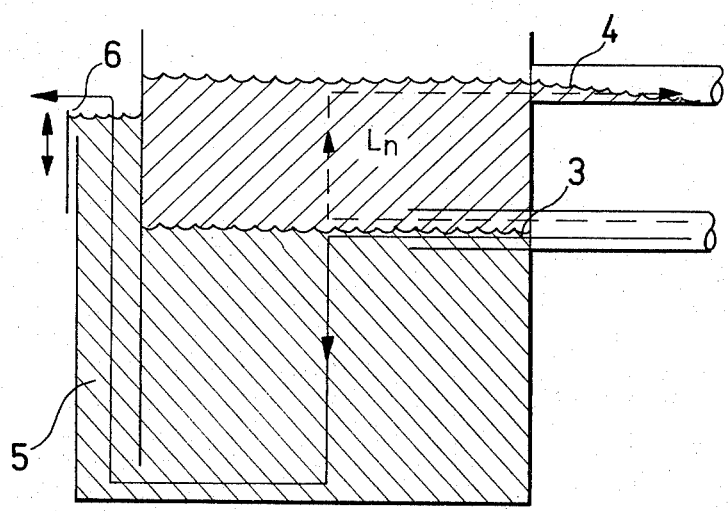
FIG. 2 shows an alternative embodiment of a part of the extraction apparatus shown in FIG. 1.

Referring to FIG. 1, S indicates a mixing chamber, L a settling basin, A an auxiliary space for the overflow of heavy liquid, and M a driving motor. Index $n-1$, $n$, $n+2$ is the ordinal number of the stage in a multi-stage extraction apparatus. 1 is a mixer, 2 is an additional device for promoting the liquid flow of heavy liquid, 3 is a flow pipe for the dispersion phase, 4 is a light-liquid overflow pipe, 5 is a heavy-phase gooseneck, 6 is a vertically adjustable overflow sill for the heavy phase. The ruling slanted to the left indicates heavy liquid and the ruling slanted to the right indicates the light liquid. The arrows indicate the flowing directions of the liquids and the dispersion. The shapes of the mixing and settling basins (L, S) are arbitrary, as are the heavyphase gooseneck with its auxiliary spaces and the mounting of the pipes of the dispersion phase. The mixing of the liquids in the mixing space can be arranged by any known mixing system. The gooseneck can also be constructed inside the settling basin (L) as is shown in FIG. 2.

The mixing of the liquids in the mixing space can be carried out by any known mixing system. If an additional device has been attached to the mixer to promote liquid flow, its type is also arbitrary. The effectiveness of the additional device (2) can be regulated by vertical movements.

The following advantages are gained by an extraction apparatus according to the invention: the stages of the apparatus are hydrostatically independent of each other, the interfaces between the liquids can be brought to the desired height, and no pumping is required to move the different phases. If the liquid flow needs to be promoted in order to increase the effectiveness of the apparatus, this can be arranged by attaching an additional device to the lengthened arm of the mixer to increase the flow, in which case, however, the consumption of energy is smaller than in previously known apparatuses.

We claim:

1. An extraction apparatus for counter-current extraction between a heavier liquid and a lighter liquid, comprising a plurality of horizontally displaced, vertically extending extraction stages, said stages being staggered in the vertical direction so as to facilitate the flow of the lighter fluid by gravity, each stage comprising a mixing chamber having mechanical stirring means therein, a settling basin, a first flow pipe means leading from said mixing chamber at a point between the upper and lower ends thereof to said settling basin at a point above the level of the heavy phase and extending through the wall into the center of said settling chamber, impeller means in the said mixing chamber located at the same level of said first flow pipe means, a second flow pipe means leading from the upper part of each settling basin to the upper part of the mixing chamber of the subsequent extraction stage, a vertically extending auxiliary chamber between each mixing chamber and the settling basin of the next extraction stage, a third flow pipe means leading from the bottom wall of the settling basin of each extraction stage to and upwardly through the bottom of said auxiliary chamber, a fourth flow pipe means leading from the bottom of said auxiliary chamber to the bottom wall of each previous mixing chamber, vertically adjustable overflow means connected to the upper end of said third flow pipe in the upper part of said auxiliary chamber between said third and fourth flow pipe means, impeller mixing means located in the lower part of the mixing chamber for improving the flow of the heavier liquid in the mixing chamber, each stage of the extraction being hydrostatically independent.

2. An extraction apparatus for counter-current extraction between a heavier liquid and a lighter liquid, comprising a plurality of horizontally displaced, vertically extending extraction stages, said stages being staggered in the vertical direction so as to facilitate the flow of the lighter fluid by gravity, each stage comprising a mixing chamber having mechanical stirring means therein, a settling basin, a first flow pipe means leading from said mixing chamber at a point between the upper and lower ends thereof to said settling basin at a point above the level of the heavy phase and extending through the wall into the center of said settling chamber, impeller means in the said mixing chamber located at the same level of said first flow pipe means, a second flow pipe means leading from the upper part of each settling basin to the upper part of the mixing chamber of the subsequent extraction stage, a vertically extending auxiliary chamber located in said settling basin, a third flow pipe means leading from the bottom wall of the settling basin of each extraction stage to and upwardly through the bottom of said auxiliary chamber, a fourth flow pipe means leading from the bottom of said auxiliary chamber to the bottom wall of each previous mixing chamber, vertically adjustable overflow means connected to the upper end of said third flow pipe in the upper part of said auxiliary chamber between said third and fourth flow pipe means, impeller mixing means located in the lower part of the mixing chamber for improving the flow of the heavier liquid in the mixing chamber, each stage of the extraction being hydrostatically independent.

* * * * *